United States Patent
Kashima

(10) Patent No.: US 10,313,989 B2
(45) Date of Patent: Jun. 4, 2019

(54) METHOD AND APPARATUS FOR PROVIDING TIMING ALIGNMENT

(75) Inventor: Tsyoshi Kashima, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 2726 days.

(21) Appl. No.: 12/141,321

(22) Filed: Jun. 18, 2008

(65) Prior Publication Data

US 2008/0310395 A1     Dec. 18, 2008

Related U.S. Application Data

(60) Provisional application No. 60/944,662, filed on Jun. 18, 2007.

(51) Int. Cl.
| | |
|---|---|
| *H04W 56/00* | (2009.01) |
| *H04L 1/18* | (2006.01) |
| *H04W 74/00* | (2009.01) |
| *H04W 74/08* | (2009.01) |

(52) U.S. Cl.
CPC ......... *H04W 56/001* (2013.01); *H04L 1/1896* (2013.01); *H04W 56/0045* (2013.01); *H04W 74/006* (2013.01); *H04W 74/08* (2013.01); *H04L 1/1867* (2013.01)

(58) Field of Classification Search
CPC .......... H04W 56/001; H04W 56/0045; H04W 74/006; H04W 74/08; H04L 1/1896; H04L 1/1867
USPC ........ 370/350, 329, 335, 331, 299; 455/445, 455/450, 456.2
See application file for complete search history.

(56) References Cited

U.S. PATENT DOCUMENTS

| | | | |
|---|---|---|---|
| 5,229,996 A | | 7/1993 | Baeckstroem et al. |
| 5,778,318 A | * | 7/1998 | Talarmo et al. ........... 455/452.1 |
| 2008/0019307 A1 | * | 1/2008 | Tenny et al. .................. 370/329 |
| 2008/0068979 A1 | * | 3/2008 | Visotsky et al. .............. 370/208 |
| 2008/0069032 A1 | * | 3/2008 | Liu ................................ 370/328 |
| 2008/0080423 A1 | * | 4/2008 | Kolding et al. .............. 370/329 |
| 2008/0080472 A1 | * | 4/2008 | Bertrand et al. ............. 370/344 |
| 2008/0212539 A1 | * | 9/2008 | Bottomley et al. ........... 370/335 |

(Continued)

FOREIGN PATENT DOCUMENTS

| | | |
|---|---|---|
| EP | 1 742 501 A1 | 1/2007 |
| EP | 1 973 281 A2 | 9/2008 |

(Continued)

OTHER PUBLICATIONS

Somasundaram, Shankar. U.S. Appl. No. 60/913,316, Method and Apparatus for Handling Radio Link and Handover Failure, filed Apr. 23, 2007. pp. 1-17.*

(Continued)

*Primary Examiner* — Faruk Hamza
*Assistant Examiner* — Tito Q Pham
(74) *Attorney, Agent, or Firm* — Ditthavong & Steiner, P.C.

(57) ABSTRACT

An approach includes generating a control message having a format designated for resource allocation, wherein the control message includes a plurality of control fields. One of the control fields is reserved to specify information other than information for resource allocation, the value indicating timing alignment information or information for starting a random access procedure. The control message is transmitted over a control channel according to a lower layer protocol.

31 Claims, 12 Drawing Sheets

(56) References Cited

U.S. PATENT DOCUMENTS

| | | | |
|---|---|---|---|
| 2008/0225772 A1* | 9/2008 | Xu | 370/313 |
| 2008/0232310 A1* | 9/2008 | Xu | 370/329 |
| 2008/0233974 A1* | 9/2008 | Xu | 455/458 |
| 2008/0259873 A1* | 10/2008 | Ahmavaara et al. | 370/331 |
| 2008/0268850 A1* | 10/2008 | Narasimha et al. | 455/437 |
| 2008/0285670 A1* | 11/2008 | Walton et al. | 375/260 |
| 2008/0298433 A1* | 12/2008 | Tiirola et al. | 375/132 |
| 2008/0310395 A1 | 12/2008 | Kashima | |
| 2009/0116434 A1* | 5/2009 | Lohr et al. | 370/329 |
| 2009/0175159 A1* | 7/2009 | Bertrand et al. | 370/203 |
| 2009/0252125 A1* | 10/2009 | Vujcic | 370/336 |
| 2010/0316096 A1* | 12/2010 | Adjakple et al. | 375/211 |

FOREIGN PATENT DOCUMENTS

| | | |
|---|---|---|
| EP | 1 973 366 A2 | 9/2008 |
| EP | 2 060 027 | 5/2009 |
| EP | 2 073 419 A1 | 6/2009 |
| WO | WO 2007/046619 A1 | 4/2007 |
| WO | WO 2008/023932 A1 | 2/2008 |
| WO | WO 2008/024788 A2 | 2/2008 |
| WO | WO 2008/096959 A1 | 8/2008 |
| WO | WO 2008/135853 A1 | 11/2008 |
| WO | WO 2008/155734 A2 | 12/2008 |

OTHER PUBLICATIONS

Russian Office action for corresponding RU application No. 2010101039/09(001352) dated Mar. 18, 2011, pp. 1-7.
International Search Report and Written Opinion, PCT/IB2008/052405, dated Feb. 2, 2009, pp. 1-16.
European Office action for corresponding EP App. No. 08 763 376.4-2412 dated Mar. 29, 2010, pp. 1-5.
Korean Office action for corresponding KR Application No. 2010-7000971 dated Sep. 26, 2011.
Nikos Passas, et al., "Quality-of-Service-Oriented Medium Access Control for Wireless ATM Networks", Lazaros Merakos, University of Athens, IEEE Communication Magazine, Nov. 1997, pp. 42-50.
D1: Texas Instruments, Transmission of Uplink Timing Advance Command in E-UTRA, R1-070741, 3GPP, Feb. 16, 2007, pp. 1-4.
D2: Texas Instruments, Transmission of Uplink Timing Advance Command in E-UTRA, R-071477, 3GPP, Mar. 30, 2007, pp. 1-4.
D3: Texas Instruments, Transmission of Uplink Timing Advance Command in E-UTRA, R1-072197, 3GPP, May 11, 2007, pp. 1-4.
D4: Motorola, Uplink Synchronization Maintenance and Timing Advance, R1-070794, 3GPP, Feb. 16, 2007, pp. 1-3.
D5: Motorola, Uplink Synchronization Maintenance and Timing Advance, R1-071329, 3GPP, Mar. 30, 2007, pp. 1-3.
D6: Motorola, Motorola, Uplink Synchronization Maintenance and Timing Advance, R1-072143, 3GPP, May 11, 2007, pp. 1-3.
D7: NTT DoCoMo et al., Timing Alignment Method for E-UTRA Uplink, R1-072420, 3GPP, May 11, 2007, pp. 1-3.
D8: Motorola, Uplink Timing Control, R1-070045, 3GPP, Jan. 15-19, 2006, pp. 1-2.
Japanese Office Action for related Japanese Patent Application No. 2010-512829 dated Jan. 24, 2012, pp. 1-8.
Final Rejection for related Korean Application No. 10-2010-7000971 dated Apr. 26, 2012, pp. 1-3.
Motorola, Uplink Synchronization Maintenance and Timing Advance, 3GPP TSG RAN1#48, R1-070794, Feb. 12-16, 2007, pp. 1-4.
Office Action for related Chinese Application No. 200880020218.6 dated Apr. 19, 2012, pp. 1-17.
Texas Instruments, Transmission of Uplink Timing Advance Command in E-UTRA, 3GPP TSG RAN WG1#48, R1-070741, Feb. 12-16, 2007, pp. 1-5.
Office Action for corresponding Israel Patent Application No. 239024 dated Dec. 22, 2015, 6 Pages.
Office Action for corresponding Israeli Application No. 202559, dated Feb. 2, 2014, with English language translation, 6 pages.

* cited by examiner

METHOD AND APPARATUS FOR PROVIDING TIMING ALIGNMENT

RELATED APPLICATIONS

This application claims the benefit of the earlier filing date under 35 U.S.C. § 119(e) of U.S. Provisional Application Ser. No. 60/944,662 filed Jun. 18, 2007, entitled "Method and Apparatus For Providing Timing Alignment," the entirety of which is incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves control signaling to ensure efficient and accurate delivery of data.

SOME EXEMPLARY EMBODIMENTS

Therefore, there is a need for an approach for providing efficient signaling, which can co-exist with already developed standards and protocols.

According to one embodiment of the invention, a method comprises generating a control message to provide either timing alignment information or a dedicated random access preamble, wherein the control message includes a plurality of control fields. The method also comprises reusing one of the control fields to specify the timing alignment information or the dedicated random access preamble, wherein the control message is transmitted over a control channel according to a lower layer protocol.

According to another embodiment of the invention, an apparatus comprises logic configured to generate a control message to provide either timing alignment information or a dedicated random access preamble, wherein the control message includes a plurality of control fields. The logic is further configured to reuse one of the control fields to specify the timing alignment information or the dedicated random access preamble. The control message is transmitted over a control channel according to a lower layer protocol.

According to another embodiment of the invention, an apparatus comprises means for generating a control message to provide either timing alignment information or a dedicated random access preamble, wherein the control message includes a plurality of control fields. The apparatus also includes means for reusing one of the control fields to specify the timing alignment information or the dedicated random access preamble. The control message is transmitted over a control channel according to a lower layer protocol.

According to another embodiment of the invention, a method comprises receiving a control message specifying either timing alignment information or a dedicated random access preamble, wherein the control message includes a plurality of control fields, and one of the control fields is reused to specify the timing alignment information or the dedicated random access preamble. The control message is transmitted over a control channel according to a lower layer protocol including a L1/L2 protocol or a medium access control (MAC) layer protocol.

According to another embodiment of the invention, an apparatus comprises receiving logic configured to receive a control message specifying either timing alignment information or a dedicated random access preamble, wherein the control message includes a plurality of control fields, and one of the control fields is reused to specify the timing alignment information or the dedicated random access preamble. The control message is transmitted over a control channel according to a lower layer protocol including a L1/L2 protocol or a medium access control (MAC) layer protocol.

According to yet another embodiment of the invention, an apparatus comprises means for receiving a control message specifying either timing alignment information or a dedicated random access preamble, wherein the control message includes a plurality of control fields, and one of the control fields is reused to specify the timing alignment information or the dedicated random access preamble. The control message is transmitted over a control channel according to a lower layer protocol including a L1/L2 protocol or a medium access control (MAC) layer protocol.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing timing alignment information or dedicated random access preamble information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with a Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
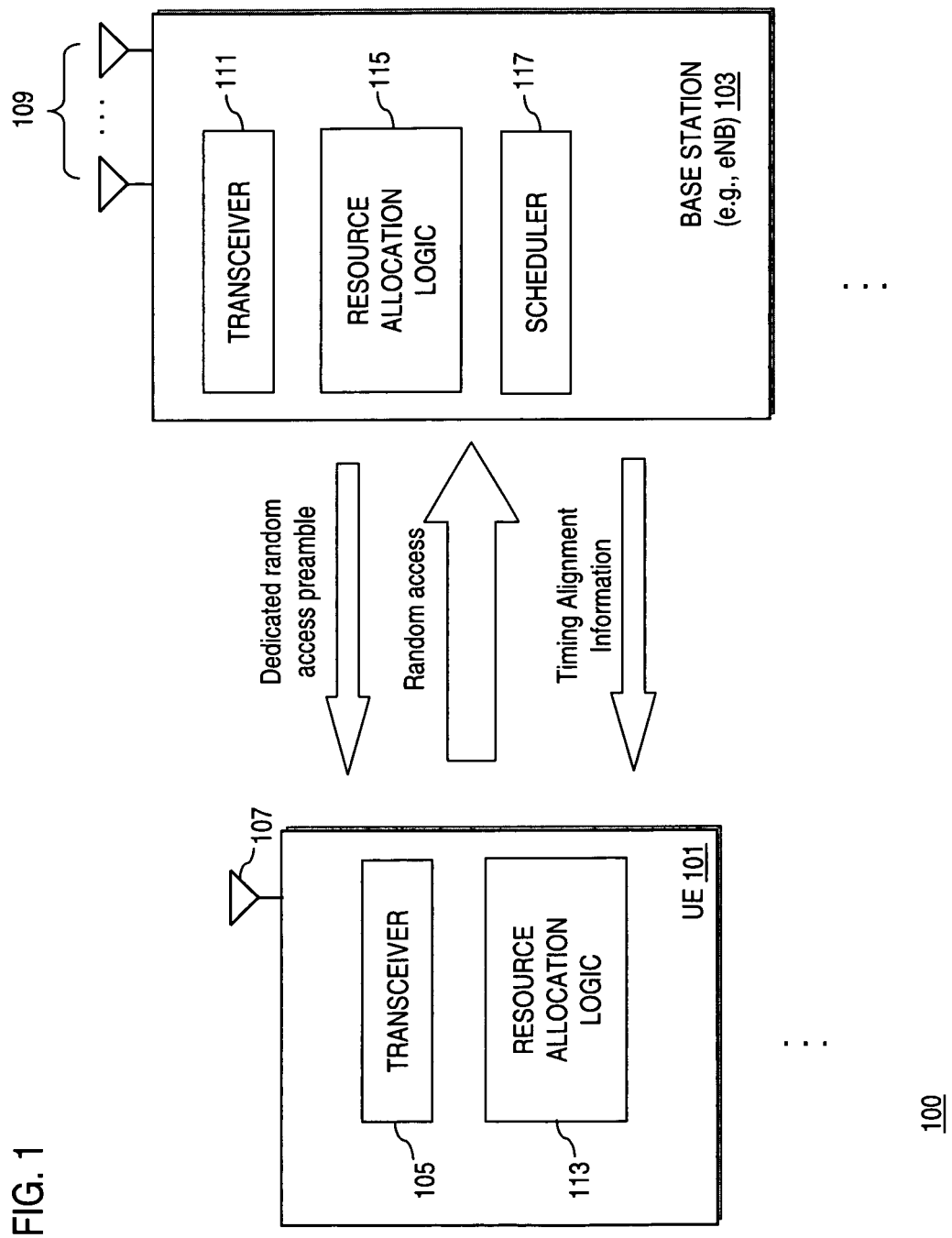
FIG. 1 is a diagram of a communication system capable of providing control signaling, according to an exemplary embodiment.

FIG. 1 is a diagram of communication systems capable of providing resource allocation, according to various embodiments of the invention. As shown in FIG. 1, one or more user equipment (UEs) 101 communicate with a base station 103, which is part of an access network (e.g., 3GPP LTE (or E-UTRAN, etc.). Under the 3GPP LTE architecture (as shown in FIGS. 6A-6D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants or any type of interface to the user (such as "wearable" circuitry, etc.). The UE 101 includes a transceiver 105 and an antenna system 107 that couples to the transceiver 105 to receive or transmit signals from the base station 103. The antenna system 107 can include one or more antennas.

As with the UE 101, the base station 103 employs a transceiver 111, which transmits information to the UE 101. Also, the base station 103 can employ one or more antennas 109 for transmitting and receiving electromagnetic signals. For instance, the Node B 103 may utilize a Multiple Input Multiple Output (MIMO) antenna system 109, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

The mobile station 101 employs resource allocation logic 113 to request resources from the network. On the network side, the base station 103 provides resource allocation logic 115 to grant resources for a communication link with the mobile station 101. The communication link, in this example, involves the downlink, which supports traffic from the network to the user. Once the resource is allocated, data transmission can commence.

In this example, the allocated resources involve physical resource blocks (PRB), which correspond to OFDM symbols, to provide communication between the UE 101 and the base station 103. That is, the OFDM symbols are organized into a number of physical resource blocks (PRB) that includes consecutive sub-carriers for corresponding consecutive OFDM symbols. To indicate which physical resource blocks (or sub-carrier) are allocated to a UE 101, two exemplary schemes include: (1) bit mapping, and (2) (start, length) by using several bits indicating the start and the length of an allocation block.

To ensure reliable data transmission, the system 100 of FIG. 1, in certain embodiments, uses concatenation of Forward Error Correction (FEC) coding and an Automatic Repeat Request (ARQ) protocol commonly known as Hybrid ARQ (HARQ). Automatic Repeat Request (ARQ) is an error detection mechanism using error detection logic (not shown). This mechanism permits the receiver to indicate to the transmitter that a packet or sub-packet has been received incorrectly, and thus, the receiver can request the transmitter to resend the particular packet(s). This can be accomplished with a Stop and Wait (SAW) procedure, in which the transmitter waits for a response from the receiver before sending or resending packets. The erroneous packets are used in conjunction with retransmitted packets.

According to certain embodiments, the system 100 provides synchronous HARQ and asynchronous HARQ. Synchronous HARQ means that the network (specifically, the scheduler 117) is restricted in allocation of resources for re-transmission. This suggests that the network needs to re-use current allocation either with (scheduled synchronous) or without (unscheduled synchronous) any changes, at specific time/frequency after the first transmission (new data transmission). Alternatively, if allocation details have changed (scheduled synchronous), the network would need to provide new allocation resources to UE 101 in resource allocation (PDCCH) at a fixed interval after first transmission/scheduling. UE 101 would only need to listen to the PDCCHs that are available (if any) at certain time instants.

By contrast, with asynchronous HARQ, the scheduler 117 is not obliged to satisfy the timing requirements with respect to scheduling of resources to the UE 101 for the HARQ re-transmission. Each UE 101 would need to listen to all DL PDCCHs in order to receive the resource allocation for HARQ re-transmission.

From the perspective of the UE 101, synchronous HARQ is simple and allows for power saving. However, this scheme does restrict the scheduling freedom of the packet scheduler 117 in the network, potentially affecting the amount of needed re-transmissions so as to increase UE power consumption (e.g., in the case of unfavorable scheduling options). From the scheduler point of view, the benefit of synchronous re-transmission is that there is no need to use any PDCCH resources for scheduling of re-transmissions.

According to certain embodiments, the system 100 provides for transmitting timing alignment (TA) information or a dedicated random access preamble using L1/L2 control signaling or medium access control (MAC) layer signaling. Furthermore, for the MAC layer signaling when the UE 101 is out of uplink synchronization, the approach indicates whether to apply Hybrid ARQ (HARQ) using L1/L2 control signal. In an exemplary embodiment, the signaling is controlled by a resource allocation logic (or module) 115.

A data transmission scheduler 117 operates in conjunction with the resource allocation module 115 to provide scheduling of data transmissions to the UE 101. Although the resource allocation logic 115 is shown as part the base station 103, it is contemplated that the resource allocation logic 115 can be implemented elsewhere on the network side.

On the network side, a radio network controller (RNC) (not shown) communicates with the base station 103 to manage radio resources. In addition to radio resource management, the RNC provides maintenance and operation of Radio Resource Control (RRC). According to one embodiment, the base station 103, as an eNB, can encompass the RNC functions, as shown in FIGS. 6A-6D.

The system 100 provides various channel types: physical channels, transport channels, and logical channels. In this example, the physical channels are established between the UE 101 and the base station 103, and transport channels and logical channels are established among the UE 101, BS 103 and RNC. Physical channels can include a physical downlink shared channel (PDSCH), a dedicated physical downlink dedicated channel (DPDCH), a dedicated physical control channel (DPCCH), etc.

The transport channels can be defined by how they transfer data over the radio interface and the characteristics of the data. The transport channels include a broadcast channel (BCH), paging channel (PCH), a dedicated shared channel (DSCH), etc. Other exemplary transport channels are an uplink (UL) Random Access Channel (RACH), Common Packet Channel (CPCH), Forward Access Channel (FACH), Downlink Shared Channel (DSCH), Uplink Shared Channel (USCH), Broadcast Channel (BCH), and Paging Channel (PCH). A dedicated transport channel is the UL/DL Dedicated Channel (DCH). Each transport channel is mapped to one or more physical channels according to its physical characteristics.

Each logical channel can be defined by the type and required Quality of Service (QoS) of information that it carries. The associated logical channels include, for example, a broadcast control channel (BCCH), a paging control channel (PCCH), Dedicated Control Channel (DCCH), Common Control Channel (CCCH), Shared Channel Control Channel (SHCCH), Dedicated Traffic Channel (DTCH), Common Traffic Channel (CTCH), etc.

Table 1 shows a conventional format for providing resource allocation of downlink data:

TABLE 1

| PDCCH format | |
| --- | --- |
| Field | Description |
| Name of the Identity Identification | Identifier Cell Radio Network Temporary Identity |
| Error Detection | Cyclic Redundancy Check (CRC) |
| Physical Resource Block Allocation Indicator | Specifies allocation of resources |
| Transport Format Indicator (TFI) | Specifies modulation and coding scheme (MCS) |
| HARQ control | Provides acknowledgement signaling in support of HARQ |

Figure 3:
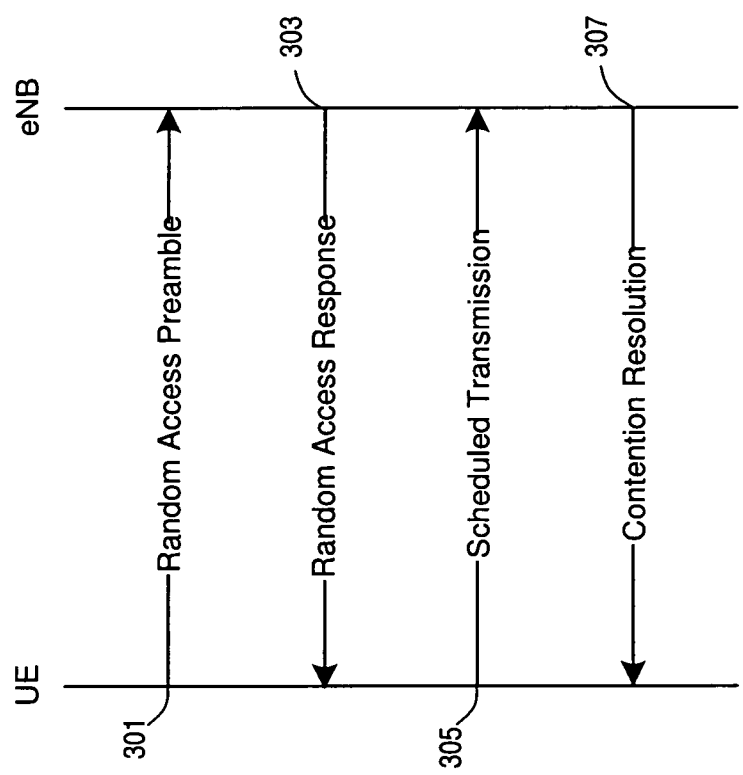
FIG. 3 is a diagram of a contention based random access procedure that can be utilized in conjunction with various exemplary embodiments.
Figure 4:
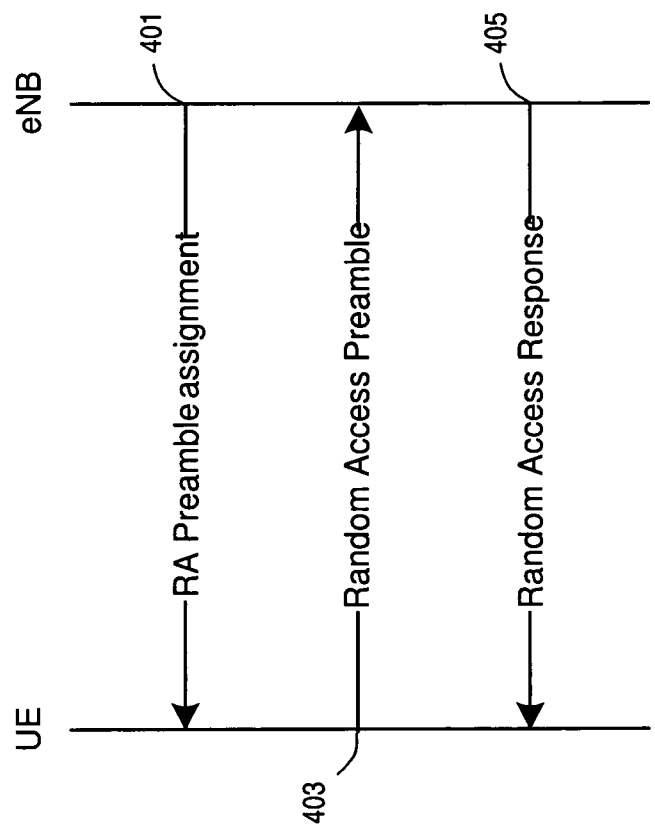
FIG. 4 is a diagram of a non-contention based random access procedure that can be utilized in conjunction with various exemplary embodiments.

In the LTE (e.g., RAN2) architecture, the random access procedure takes two distinct forms: a contention based procedure (as detailed in FIG. 3) and a non-contention based (applicable to only handover and DL data arrival) (as detailed in FIG. 4). For example, uplink (UL) synchronization is performed via random access procedure. In the case of downlink (DL) data arrival to the UL-non-synchronized UE 101, eNB 103 can assign a dedicated random access preamble to the UE 101 so that the random access procedure can be performed without contention. It is noted that this scheme introduces several concerns with how signaling can be efficiently performed to convey the dedicated random access preamble and the timing alignment information as well as application of Hybrid ARQ (HARQ). The processes for transmitting such information, described below, address these concerns.

Figure 2A:
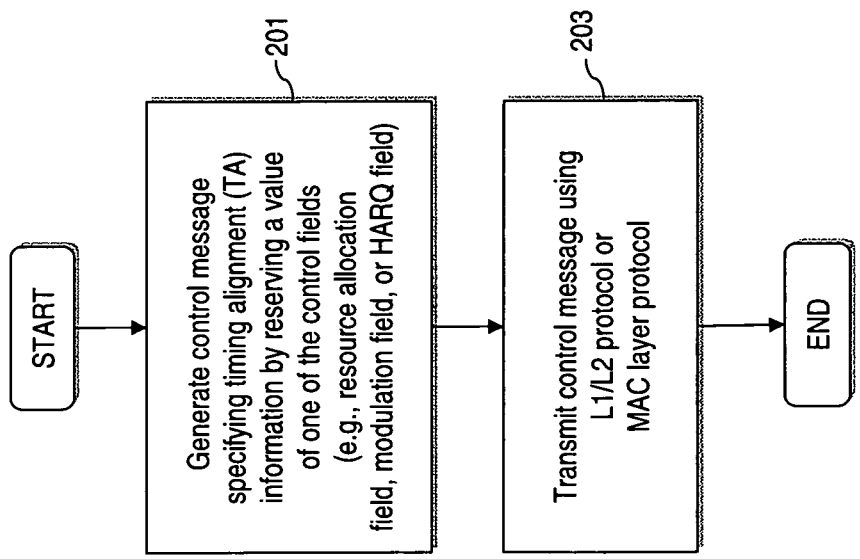
FIGS. 2A-2C are flowcharts of processes for conveying dedicated random access preamble information or timing alignment information, according to various exemplary embodiments.
Figure 2B:
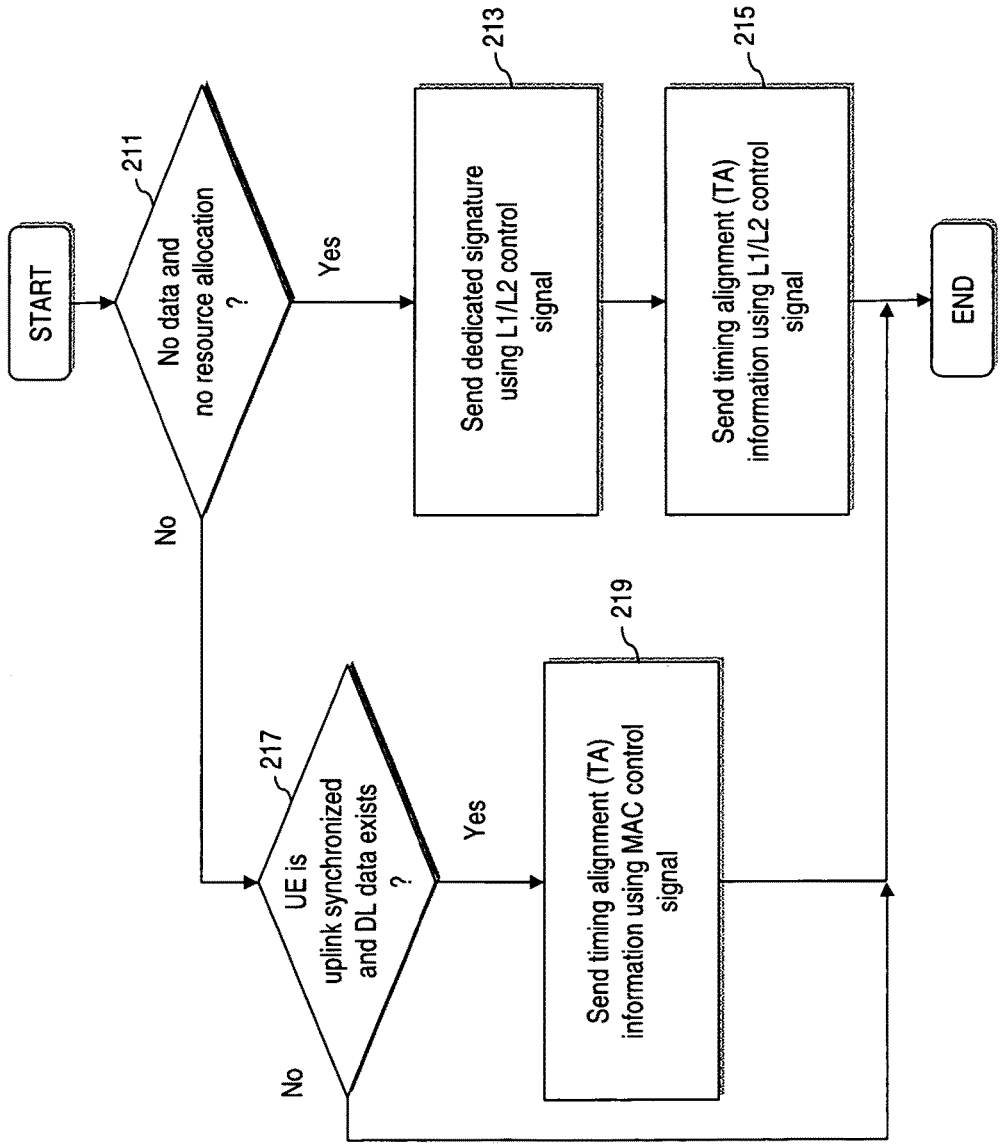
Figure 2C:
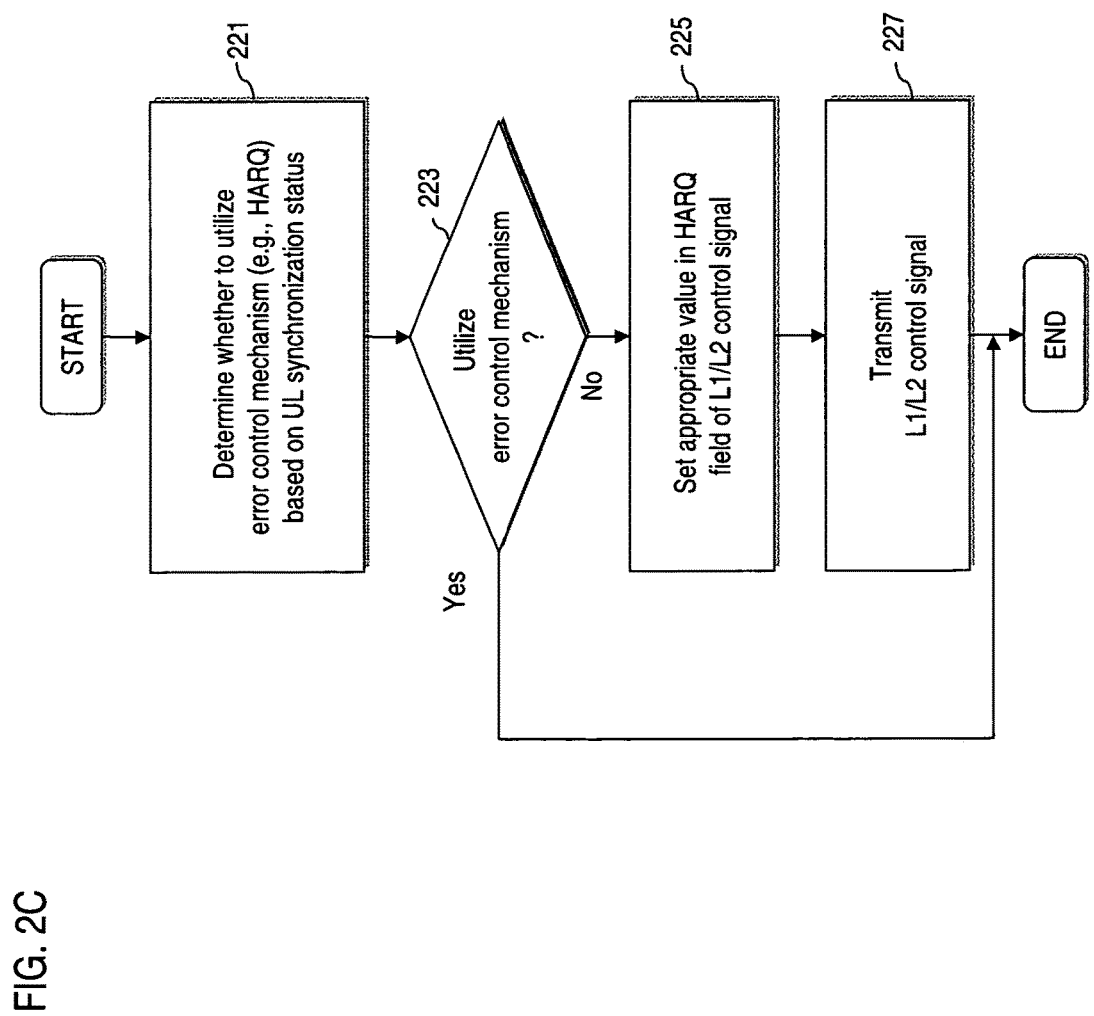

FIGS. 2A-2C are flowcharts of processes for conveying dedicated random access preamble information or timing alignment information, according to various exemplary embodiments. Specifically, FIG. 2A shows an approach whereby timing alignment (TA) information can be signaled with minimal or no additional overhead. As shown, in step 201, a control message is generated to include TA information, which is specified by "reusing" an existing control field, such as resource allocation field, the modulation field, or the Hybrid ARQ (HARQ) field, by reserving a certain value of one of the fields to specify information for something other than resource allocation. That is, instead of creating a separate field for TA information, this information is transmitted over a control channel, as in step 203, without incurring additional signaling overhead. For example, a value of one of the fields can be designated or reserved for timing alignment information or signaling the start of the random access procedure. Moreover, the one value can indicate a special use of the rest of the bits. According to one embodiment, the control message is transmitted by utilizing lower layer protocols—e.g., L1/L2 protocol or medium access control (MAC) layer protocol. Further, the control channel can include either a downlink shared channel or an uplink shared channel.

By way of example, a control signal format for L1/L2 control signaling is as follows (Table 1):

TABLE 1

| Purpose | Used bits | Comment |
| --- | --- | --- |
| | | 5 MHz DL |
| Resource Allocation | 18 | PRB assigned for UE |
| TBS + MCS | 7 | Modulation 2 bits, 5 for transport block size (TBS) |
| HARQ | 5 | Asynchronous HARQ: 3 bit for HARQ processes and 2 for RV |
| Pre-coding | 3 | Depends on the decision of pre-coding bandwidth for 2 (4) antenna transmission 1-3 (4) bits, assuming that one pre-coding for whole allocation. |
| Dual stream/ 2CW | 11 | Depends on decision in Multiple Input Multiple Output (MIMO) group 6-11 (up to 14) bits for 2 (4) Tx antennas. |
| MAC-ID + CRC | 20 | 16-24 bit CRC (Cyclic Redundancy Check) |
| | | 5 MHz UL |
| Resource Allocation | 9 | Consecutive PRB assigned to UE |
| TBS + MCS | 7 | Modulation+ Number of info bits and coding |
| HARQ | 2 | Synchronous HARQ: 2-3 bit sequence number including implicit acknowledgement of previous TB |

TABLE 1-continued

| Purpose | Used bits | Comment |
|---|---|---|
| PC | 2 | Relative commands. |
| Sounding pilot indication | 1 | Indicating is sounding pilot present in the last LB (from other UEs) or is the last LB available for data. |
| CQI indication | 1 | Scheduled CQI report should be included with the data. |
| ACK/NACK indication | 1 | Indicating whether UE should reserve a resource for ACK/NACK in PUSCH. |
| Multiantenna technique | 2 | Depending decision on multi user MIMO and UL multi-antenna technique up to 2 bits |
| UE_id + CRC | 20 | 16-24 bit CRC |

The control format can be generalize as follows, according to an exemplary embodiment (Table 2):

TABLE 2

| Purpose | used bits | Comment |
|---|---|---|
| DL (5 MHz) | | |
| MAC-ID (=UE ID) + CRC | 16-24 | 16-24 bit CRC |
| Modulation | 2 | |
| Transport block size (coding rate) | 5 | |
| HARQ | 5 | Asynchronous HARQ: 3 bit for HARQ processes and 2 for RV |
| Others | Around 14 | MIMO and pre-coding related information |
| Resource Allocation | 18 | PRB assigned for UE |
| UL (5 MHz) | | |
| MAC-ID (=UE ID) + CRC | 16-24 | 16-24 bit CRC |
| Modulation | 2 | |
| Transport block size (coding rate) | 5 | |
| HARQ | 2 | Synchronous HARQ: 2-3 bit sequence number including implicit acknowledgement of previous TB |
| Others | Around 7 | PC command. Indicators for pilot, CQI, ACK/NACK. MIMO-related. |
| Resource Allocation | 9 | Consecutive PRB assigned to UE |

For the purposes of illustration, the approach, according to certain embodiments, is explained in the context of a physical downlink control channel (PDCCH) of LTE and HARQ operation. FIG. 2B shows a process for signaling the dedicated signature and the TA information. According to one embodiment, the assignment of dedicated random access preamble can involve the use of L1/L2 control signal; however, it is contemplated that MAC layer signaling can alternatively be utilized. As for the timing alignment (TA) information signaling, both types of signaling can be specified in the LTE system 100. According to one embodiment, L1/L2 control signaling is utilized in the case wherein no resource is allocated for data. As such, the process determines whether there exists data and associated allocation, as in step 211. If there is no data or resource allocation, a dedicated signature is transmitted using L1/L2 control signaling (step 213). Thereafter, timing alignment information is sent, per step 215. However, if there is data or resource has been allocated (per step 211), the process checks whether the UE 101 is uplink synchronized and that indeed DL data exists, as in step 217. If so, the TA information is transmitted using MAC control signaling, per step 219.

In summary, when UE 101 is in UL-synchronization and there is DL data, the TA information can be sent in DL MAC control signal. However, if UE 101 is not in UL-synchronization, or there is no DL data to be transmitted and no resource allocation, TA information can be sent via L1/L2 control signal for optimization.

To further illustrate this process of reuse of the physical downlink control channel, the following operation is described, according to various embodiments. The system 100, according to certain embodiments, permits use of L1/L2 control signal without any resource allocation for data; this can be a L1/L2 control signal either for downlink shared channel (DL-SCH) or for uplink shared channel (UL-SCH). In case of DL-SCH, the UE 101 simply decodes the L1/L2 control signal, but does not decode the data allocation. In case of UL-SCH, the UE 101 decodes the L1/L2 control signal, and does not send any data. According one embodiment, for example, transport block size (TBS) can be set to, for example, "0" (the number of resource blocks to be used=0, or coding rate type=0) to indicate that there is no resource allocation. A L1/L2 control signal either for DL-SCH or for UL-SCH can be generated. When there is no resource allocation for data, the field for "Resource Allocation", "Modulation", "HARQ", etc. can be reused for other purposes.

In one embodiment, a dedicated random access preamble and PRACH (Physical Random Access Channel) resource block identifier, which identifies the time-frequency resource for UEs to make a random access burst, can be included in the field of "Resource Allocation." It is noted that various fields other than "Resource Allocation" can be also used. One PRACH resource block can have 64 independent random access preambles, for instance. Moreover, the system 100 may have several PRACH resource blocks for random access; one of these blocks can be specified in this control signal—i.e., PRACH block identifier can be defined for this.

According to one embodiment, if the eNB 103 has sufficient TA information to send to UE 101, TA information can be included, instead of a dedicated random access preamble, in the field of "Resource Allocation." It is contemplated that others fields can be utilized. In one embodiment, about 4 bits can be used to indicate the value of timing alignment.

In an exemplary embodiment, an indication bit can be provided to specify whether the content is for random access or timing alignment is included in the L1/L2 control signal. This indication bit can be in the reuse of the "Resource Allocation" field, for instance.

FIG. 2C illustrates a process for specifying whether error control is provided. For the indication of HARQ operation, even if there is a resource allocation in DL, the HARQ can be turned off for that transmission. Whether HARQ can be used depends on the UL synchronization status (per step 221). Thus, it is useful to indicate the availability of HARQ operation in the L1/L2 control signal. That is, L1/L2 control signal can indicate whether the HARQ is applied or not to data in the corresponding resource allocation. In step 223, the process determines whether HARQ is employed. If UE 101 is not in UL-synchronization, the UE 101 cannot send ACK/NACK signal in UL for DL-HARQ. In this case, "Dedicated random access preamble assignment via DL MAC control signal" and "TA information signaling via DL MAC control signal" can be performed by indicating that HARQ is not applied. Furthermore, if UE 101 is in UL-synchronization, "TA information signaling via DL MAC control signal" can be sent with the indication that HARQ is applied for utilizing more reliable transmission. According to one embodiment, a certain value of the "HARQ" field in the L1/L2 control signal can be defined to indicate that no HARQ is used, per step 225. Subsequently, the control signal is transmitted to the UE 101 (step 227).

The above approach, according to certain embodiments, provides a number of advantages. For example, when assigning a dedicated random access preamble and signaling UL timing alignment information without any DL data transmission, the described approach provides more efficient signaling mechanism. No DL-SCH is used, as L1/L2 control signal is reused. Furthermore, the approach, according to certain embodiments, provides explicit signaling, which is more reliable than an implicit scheme.

FIG. 3 is a diagram of a contention based random access procedure that can be utilized in conjunction with various exemplary embodiments of the invention. A random access procedure can be performed for the following events: 1) initial access form RRC (Radio Resource Control) Idle; 2) handover requiring random access procedure; 3) downlink data arrival during RRC connected requiring random access procedure, e.g., when UL synchronization is non-synchronized; and 4) UL data arrival during RRC connected requiring random access procedure, e.g., when UL synchronization is non-synchronized or there are no dedicated scheduling request channels available.

The contention based random access procedure, as shown, covers all four events: random access preamble, random access response, scheduled transmission and contention resolution. The non-contention based random access procedure (seen in FIG. 4) is applicable to only handover and DL data arrival. It is noted that normal DL (Downlink)/UL (Uplink) transmission can take after the random access procedure.

The contention based random access procedure is explained as follows. In step 301, the UE 101 sends random access preamble on RACH (Random Access Channel) in uplink. In turn, the eNB 103 replies with a random access response generated by the MAC and transmitted on DL-SCH (synchronization channel), per step 303. Next, the UE 101 sends, as in step 305, first scheduled UL transmission on UL-SCH. In step 307, the eNB 103 transmits contention resolution on DL-SCH.

FIG. 4 is a diagram of a non-contention based random access procedure that can be utilized in conjunction with various exemplary embodiments of the invention. This non-contention based random access procedure involves the following steps. First, the eNB 103 transmits random access preamble assignment via dedicated signaling DL, per step 401. In step 403, the UE 101 sends random access preamble on RACH in the uplink, and the eNB 103 responds with a random access response on DL-SCH, as in step 405.

One of ordinary skill in the art would recognize that the processes for providing timing alignment may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 5.

Figure 5:
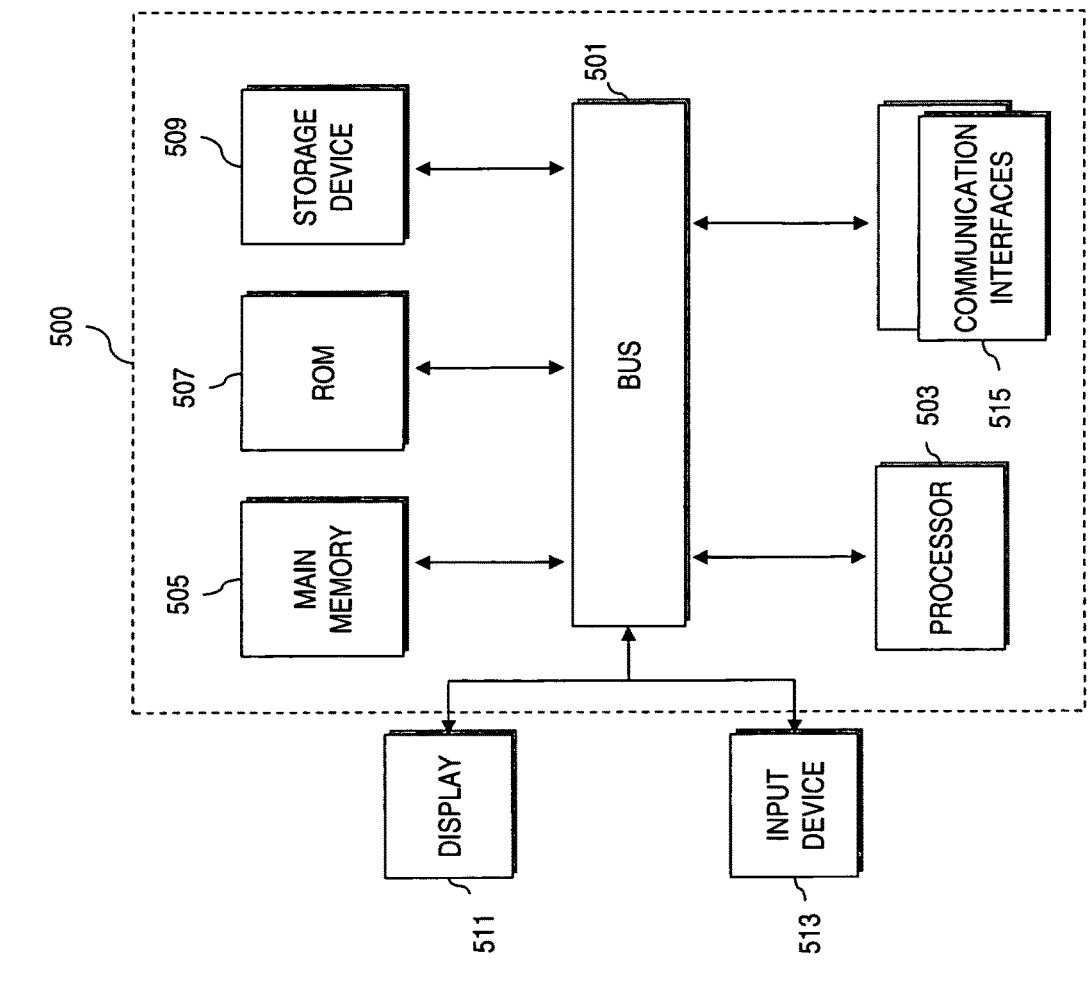
FIG. 5 is a diagram of hardware that can be used to implement an embodiment of the invention.

FIG. 5 illustrates exemplary hardware upon which various embodiments of the invention can be implemented. A computing system 500 includes a bus 501 or other communication mechanism for communicating information and a processor 503 coupled to the bus 501 for processing information. The computing system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computing system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computing system 500 may be coupled with the bus 501 to a display 511, such as a liquid crystal display, or active matrix display, for displaying information to a user. An input device 513, such as a keyboard including alphanumeric and other keys, may be coupled to the bus 501 for communicating information and command selections to the processor 503. The input device 513 can include a cursor control, such as a mouse, a trackball, or cursor direction keys, for communicating direction information and command selections to the processor 503 and for controlling cursor movement on the display 511.

According to various embodiments of the invention, the processes described herein can be provided by the computing system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 500 also includes at least one communication interface 515 coupled to bus 501. The communication interface 515 provides a two-way data communication coupling to a network link (not shown). The communication interface 515 sends and receives electrical, electromagnetic, or optical signals that carry digital data streams representing various types of information. Further, the communication interface 515 can include peripheral interface devices, such as a Universal Serial Bus (USB) interface, a PCMCIA (Personal Computer Memory Card International Association) interface, etc.

The processor 503 may execute the transmitted code while being received and/or store the code in the storage device 509, or other non-volatile storage for later execution. In this manner, the computing system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501.

Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 6A-6D are diagrams of communication systems having exemplary long-term evolution (LTE) architectures, in which the user equipment (UE) and the base station of FIG. 1 can operate, according to various exemplary embodiments of the invention. By way of example (shown in FIG. 6A), a base station (e.g., destination node 103) and a user equipment (UE) (e.g., source node 101) can communicate in system 600 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination thereof. In an exemplary embodiment, both uplink and downlink can utilize WCDMA. In another exemplary embodiment, uplink utilizes SC-FDMA, while downlink utilizes OFDMA.

Figure 6A:
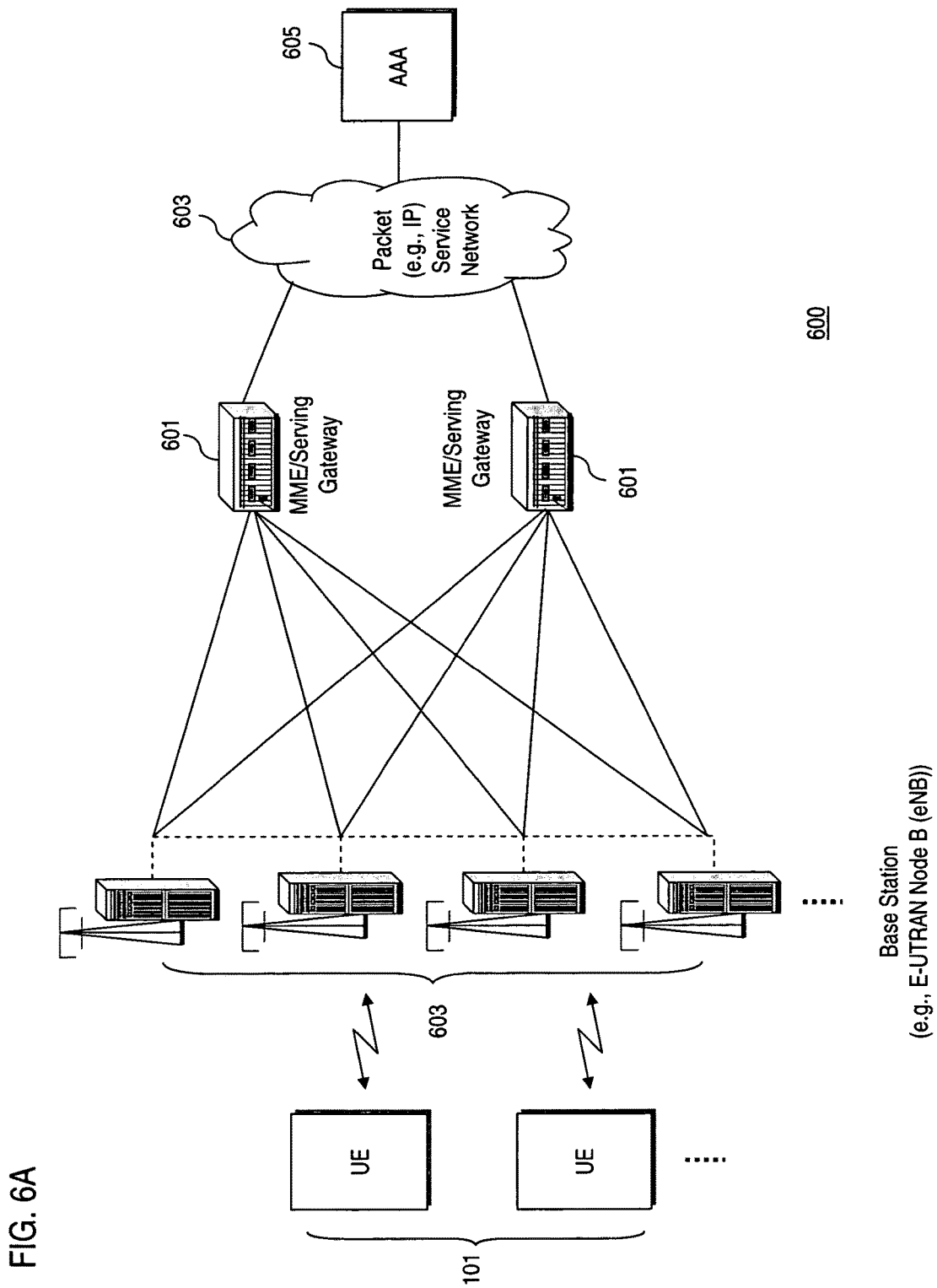
FIGS. 6A-6D are diagrams of communication systems having exemplary long-term evolution (LTE) and E-UTRA (Evolved Universal Terrestrial Radio Access) architectures, in which the system of FIG. 1 can operate to provide control signaling, according to various exemplary embodiments of the invention.

The communication system 600 is compliant with 3GPP LTE, entitled "Long Term Evolution of the 3GPP Radio Technology" (which is incorporated herein by reference in its entirety). As shown in FIG. 6A, one or more user equipment (UEs) 101 communicate with a network equipment, such as a base station 103, which is part of an access network (e.g., WiMAX (Worldwide Interoperability for Microwave Access), 3GPP LTE (or E-UTRAN or 8.9G), etc.). Under the 3GPP LTE architecture, base station 103 is denoted as an enhanced Node B (eNB).

MME (Mobile Management Entity)/Serving Gateways 601 are connected to the eNBs 103 in a full or partial mesh configuration using tunneling over a packet transport network (e.g., Internet Protocol (IP) network) 603. Exemplary functions of the MME/Serving GW 601 include distribution of paging messages to the eNBs 103, termination of U-plane packets for paging reasons, and switching of U-plane for support of UE mobility. Since the GWs 601 serve as a gateway to external networks, e.g., the Internet or private networks 603, the GWs 601 include an Access, Authorization and Accounting system (AAA) 605 to securely determine the identity and privileges of a user and to track each user's activities. Namely, the MME Serving Gateway 601 is the key control-node for the LTE access-network and is responsible for idle mode UE tracking and paging procedure including retransmissions. Also, the MME 601 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 6B:
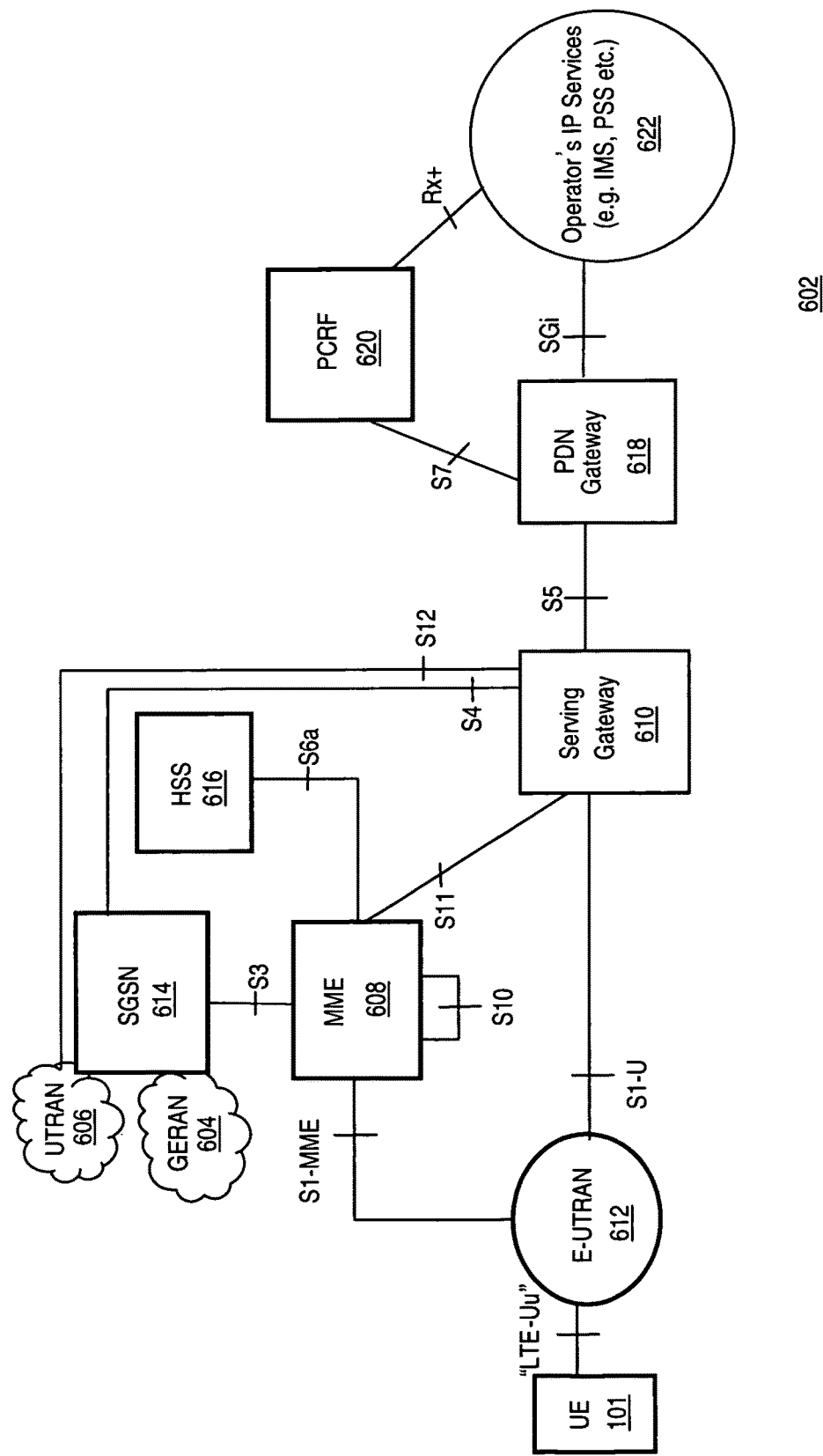

In FIG. 6B, a communication system 602 supports GERAN (GSM/EDGE radio access) 604, and UTRAN 606 based access networks, E-UTRAN 612 and non-3GPP (not shown) based access networks, and is more fully described in TR 23.882, which is incorporated herein by reference in its entirety. A key feature of this system is the separation of the network entity that performs control-plane functionality (MME 608) from the network entity that performs bearer-plane functionality (Serving Gateway 610) with a well defined open interface between them 511. Since E-UTRAN 612 provides higher bandwidths to enable new services as well as to improve existing ones, separation of MME 608 from Serving Gateway 610 implies that Serving Gateway 610 can be based on a platform optimized for signaling transactions. This scheme enables selection of more cost-effective platforms for, as well as independent scaling of, each of these two elements. Service providers can also select optimized topological locations of Serving Gateways 610 within the network independent of the locations of MMEs 608 in order to reduce optimized bandwidth latencies and avoid concentrated points of failure.

As seen in FIG. 6B, the E-UTRAN (e.g., eNB) 612 interfaces with UE 101 via LTE-Uu. The E-UTRAN 612 supports LTE air interface and includes functions for radio resource control (RRC) functionality corresponding to the control plane MME 608. The E-UTRAN 612 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 608, as a key control node, is responsible for managing mobility UE identifies and security parameters and paging procedure including retransmissions. The MME 608 is involved in the bearer activation/deactivation process and is also responsible for choosing Serving Gateway 610 for the UE 101. MME 608 functions include Non Access Stratum (NAS) signaling and related security. MME 608 checks the authorization of the UE 101 to camp on the service provider's Public Land Mobile Network (PLMN) and enforces UE 101 roaming restrictions. The MME 608 also provides the control plane function for mobility between LTE and 2G/3G access networks with the S3 interface terminating at the MME 608 from the SGSN (Serving GPRS Support Node) 614.

The SGSN 614 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 608 and HSS (Home Subscriber Server) 616. The S10 interface between MMEs 608 provides MME relocation and MME 608 to MME 608 information transfer. The Serving Gateway 610 is the node that terminates the interface towards the E-UTRAN 612 via S1-U.

The S1-U interface provides a per bearer user plane tunneling between the E-UTRAN 612 and Serving Gateway 610. It contains support for path switching during handover between eNBs 103. The S4 interface provides the user plane with related control and mobility support between SGSN 614 and the 3GPP Anchor function of Serving Gateway 610.

The S12 is an interface between UTRAN 606 and Serving Gateway 610. Packet Data Network (PDN) Gateway 618 provides connectivity to the UE 101 to external packet data networks by being the point of exit and entry of traffic for the UE 101. The PDN Gateway 618 performs policy enforcement, packet filtering for each user, charging support, lawful interception and packet screening. Another role of the PDN Gateway 618 is to act as the anchor for mobility between 3GPP and non-3GPP technologies such as WiMax and 3GPP2 (CDMA 1× and EvDO (Evolution Data Only)).

The S7 interface provides transfer of QoS policy and charging rules from PCRF (Policy and Charging Role Function) 620 to Policy and Charging Enforcement Function (PCEF) in the PDN Gateway 618. The SGi interface is the interface between the PDN Gateway and the operator's IP services including packet data network 622. Packet data network 622 may be an operator external public or private packet data network or an intra operator packet data network, e.g., for provision of IMS (IP Multimedia Subsystem) services. Rx+ is the interface between the PCRF and the packet data network 622.

Figure 6C:
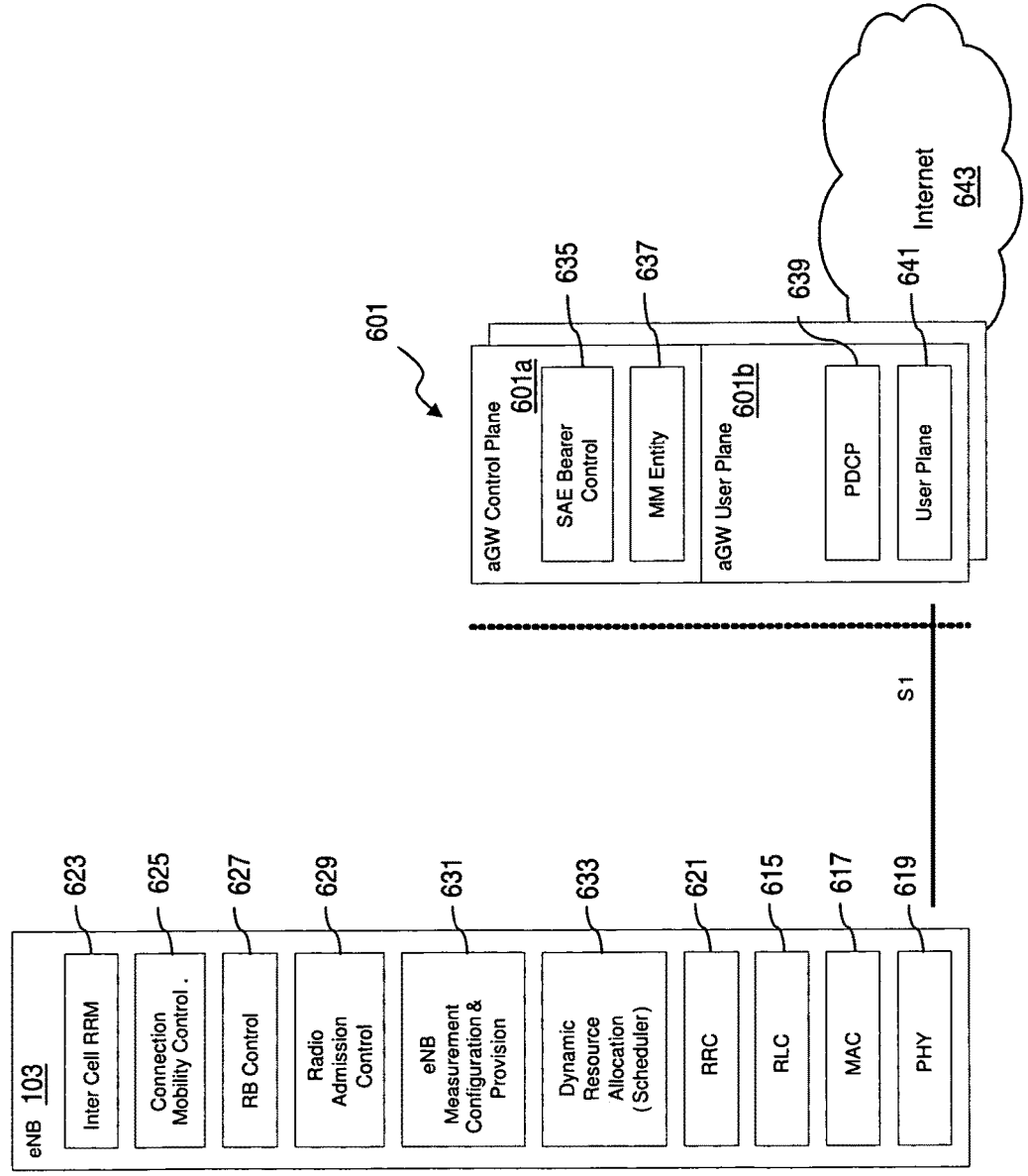

As seen in FIG. 6C, the eNB 103 utilizes an E-UTRA (Evolved Universal Terrestrial Radio Access) (user plane, e.g., RLC (Radio Link Control) 615, MAC (Media Access Control) 617, and PHY (Physical) 619, as well as a control plane (e.g., RRC 621)). The eNB 103 also includes the following functions: Inter Cell RRM (Radio Resource Management) 623, Connection Mobility Control 625, RB (Radio Bearer) Control 627, Radio Admission Control 629, eNB Measurement Configuration and Provision 631, and Dynamic Resource Allocation (Scheduler) 633.

The eNB 103 communicates with the aGW 601 (Access Gateway) via an S1 interface. The aGW 601 includes a User Plane 601a and a Control plane 601b. The control plane 601b provides the following components: SAE (System Architecture Evolution) Bearer Control 635 and MM (Mobile Management) Entity 637. The user plane 601b includes a PDCP (Packet Data Convergence Protocol) 639 and a user plane functions 641. It is noted that the functionality of the aGW 601 can also be provided by a combination of a serving gateway (SGW) and a packet data network (PDN) GW. The aGW 601 can also interface with a packet network, such as the Internet 643.

Figure 6D:
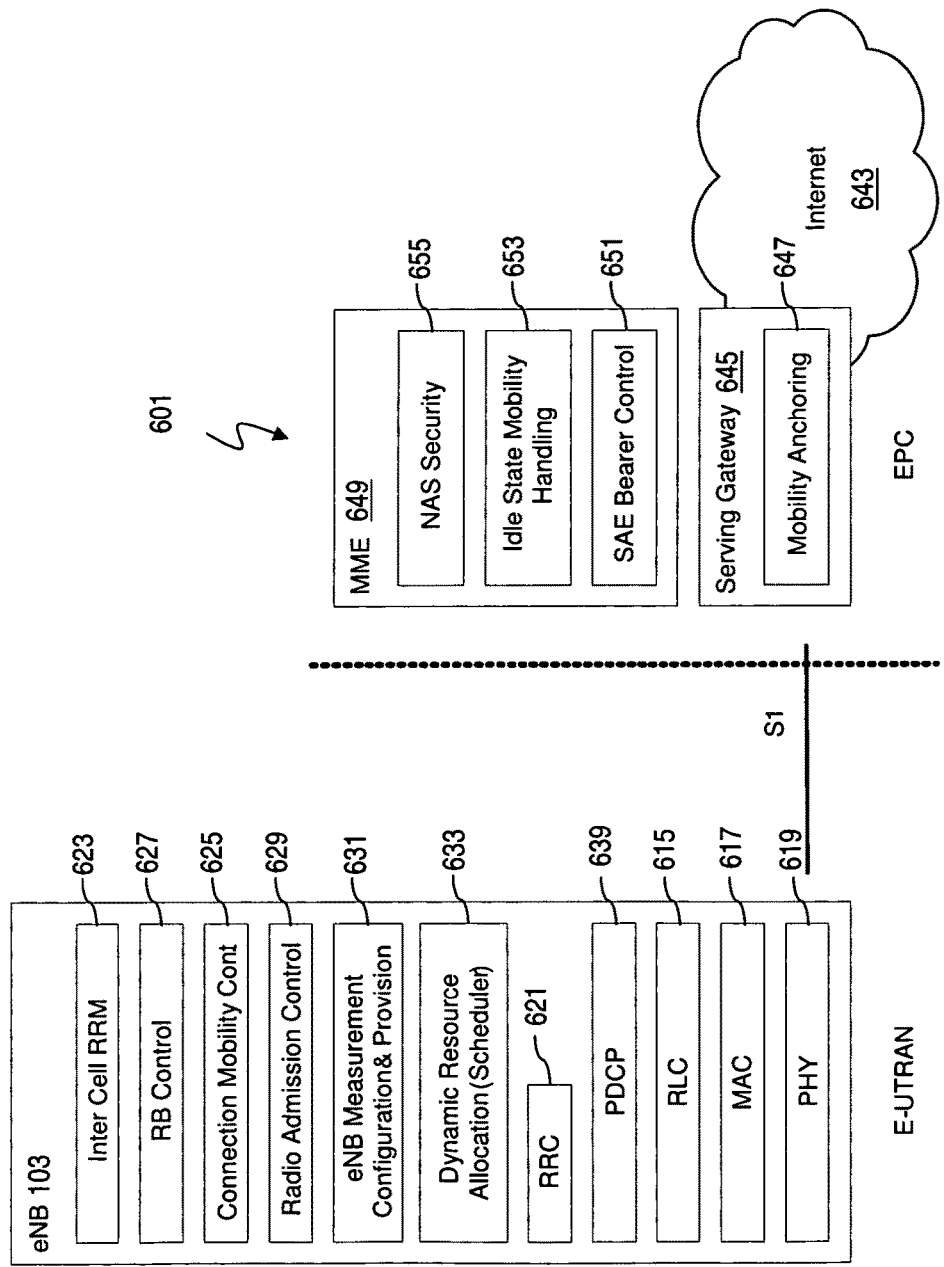

In an alternative embodiment, as shown in FIG. 6D, the PDCP (Packet Data Convergence Protocol) functionality can reside in the eNB 103 rather than the GW 601. Other than this PDCP capability, the eNB functions of FIG. 6C are also provided in this architecture.

In the system of FIG. 6D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 645, which includes a Mobility Anchoring function 647. According to this architecture, the MME (Mobility Management Entity) 649 provides SAE (System Architecture Evolution) Bearer Control 651, Idle State Mobility Handling 653, and NAS (Non-Access Stratum) Security 655.

Figure 7:
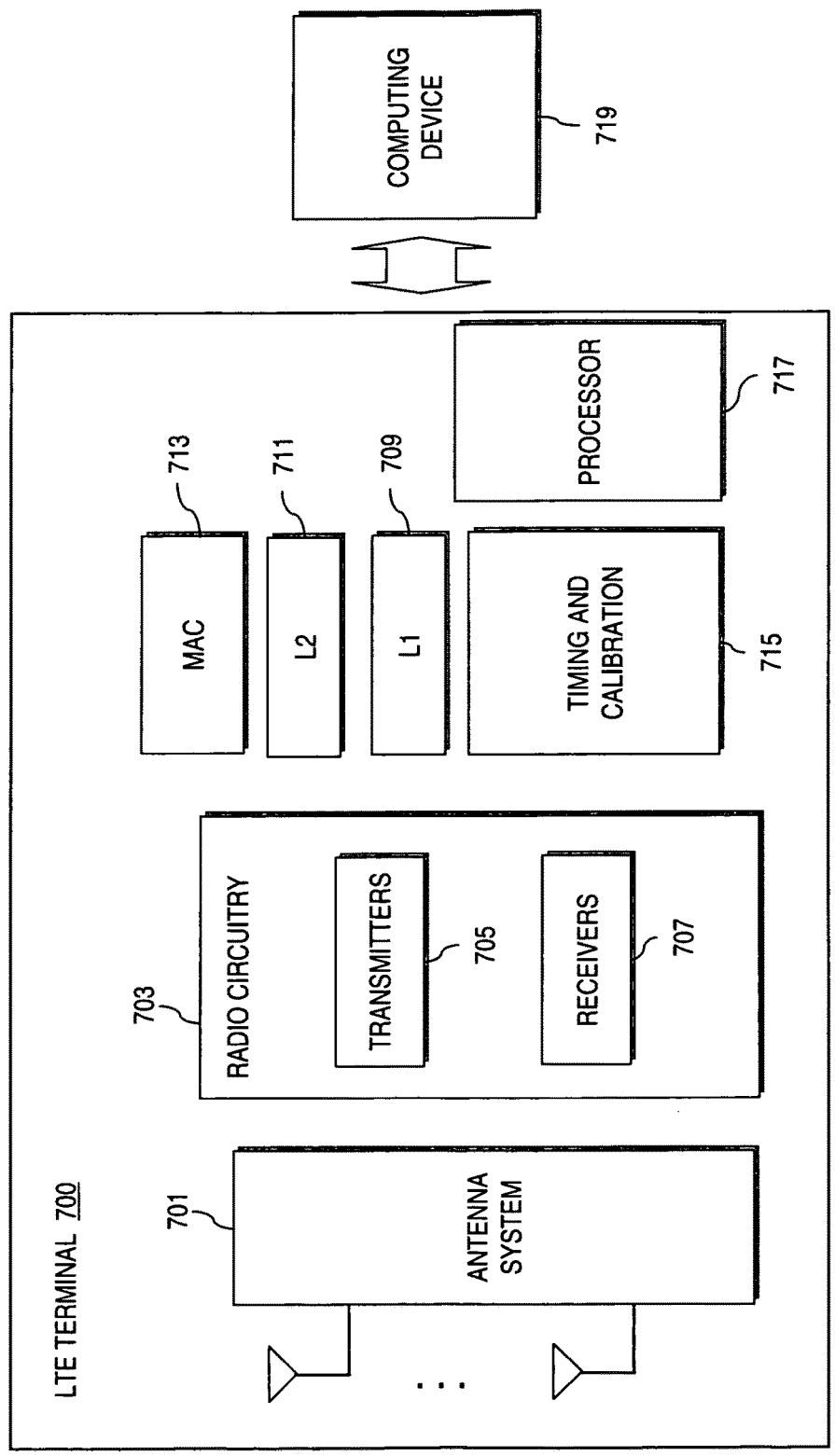
FIG. 7 is a diagram of exemplary components of an LTE terminal capable of operating in the systems of FIGS. 6A-6D, according to an embodiment of the invention.

FIG. 7 is a diagram of exemplary components of an LTE terminal capable of operating in the systems of FIGS. 6A-6D, according to an embodiment of the invention. An LTE terminal 700 is configured to operate in a Multiple Input Multiple Output (MIMO) system. Consequently, an antenna system 701 provides for multiple antennas to receive and transmit signals. The antenna system 701 is coupled to radio circuitry 703, which includes multiple transmitters 705 and receivers 707. The radio circuitry encompasses all of the Radio Frequency (RF) circuitry as well as base-band processing circuitry. As shown, layer-1 (L1) and layer-2 (L2) processing are provided by units 709 and 711, respectively. Optionally, layer-3 functions can be provided (not shown). Module 713 executes all MAC layer functions. A timing and calibration module 715 maintains proper timing by interfacing, for example, an external timing reference (not shown). Additionally, a processor 717 is included. Under this scenario, the LTE terminal 700 communicates with a computing device 719, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   generating a control message having a format designated for resource allocation, wherein the control message includes a plurality of control fields; and
   reserving a value of one of the control fields to specify information other than information for resource allocation, the value indicating information for starting a non-contention based random access procedure at a base station,
   wherein the control message is transmitted over a control channel according to a lower layer protocol.

2. A method according to claim 1, wherein the lower layer protocol includes at least one of L1, L2, or medium access control (MAC) layer protocol.

3. A method according to claim 2, further comprising:
   determining whether there is data to be transmitted; and
   determining whether resources have been allocated for transmission of the data,
   wherein the control message is transmitted using the L1 or L2 protocol if no data is to be transmitted and no resources have been allocated.

4. A method according to claim 3, further comprising:
   determining whether a terminal, configured to receive the control message, is in synchronization,
   wherein the control message is transmitted using the MAC layer protocol if the data is to be transmitted and the terminal is in synchronization.

5. A method according to claim 1, wherein the one control field includes at least one of a resource allocation field, a modulation field, and a Hybrid ARQ (HARQ) field.

6. A method according to claim 1, further comprising:
indicating whether to apply Hybrid ARQ (HARQ) within the one control field.

7. A method according to claim 1, wherein the control channel includes a physical downlink control channel.

8. A method according to claim 1, wherein the control channel is established over a radio communication network compliant with a long term evolution (LTE)-compliant architecture.

9. A method according to claim 1, wherein the non-contention based random access procedure is associated with a handover or a downlink data arrival.

10. A non-transitory computer-readable storage medium carrying one or more sequences of one or more instructions which, when executed by one or more processors, cause an apparatus to at least perform the following steps:
generating a control message having a format designated for resource allocation, wherein the control message includes a plurality of control fields; and
reserving a value of one of the control fields to specify information other than information for resource allocation, the value indicating information for starting a non-contention based random access procedure at a base station,
wherein the control message is transmitted over a control channel according to a lower layer protocol.

11. An apparatus comprising:
at least one processor; and
at least one memory including computer program code for one or more programs, the at least one memory and the computer program code configured to, with the at least one processor, cause the apparatus to perform at least the following,
generate a control message having a format designated for resource allocation, wherein the control message includes a plurality of control fields; and
reserve a value of one of the control fields to specify information other than information for resource allocation, the value indicating information for starting a non-contention based random access procedure at a base station,
wherein the control message is transmitted over a control channel according to a lower layer protocol.

12. An apparatus according to claim 11, wherein the lower layer protocol includes at least one of L1, L2, or medium access control (MAC) layer protocol.

13. An apparatus according to claim 12, wherein the apparatus is further caused to determine whether there is data to be transmitted, and to determine whether resources have been allocated for transmission of the data, the control message being transmitted using the L1 or L2 protocol if no data is to be transmitted and no resources have been allocated.

14. An apparatus according to claim 13, wherein the apparatus is further caused to determine whether a terminal, configured to receive the control message, is in synchronization, wherein the control message is transmitted using the MAC layer protocol if the data is to be transmitted and the terminal is in synchronization.

15. An apparatus according to claim 11, wherein the one control field includes at least one of a resource allocation field, a modulation field, and a Hybrid ARQ (HARQ) field.

16. An apparatus according to claim 11, wherein the apparatus is further caused to indicate whether to apply Hybrid ARQ (HARQ) within the one control field.

17. An apparatus according to claim 11, wherein the control channel includes a physical downlink control channel.

18. An apparatus according to claim 11, wherein the control channel is established over a radio communication network compliant with a long term evolution (LTE)-compliant architecture.

19. A method comprising:
receiving a control message having a format designated for resource allocation, wherein the control message includes a plurality of control fields, and a value of one of the control fields is reserved to specify information other than information for resource allocation, the value indicating information for starting of a non-contention based random access procedure, wherein the control message is received over a control channel according to a lower layer protocol.

20. A method according to claim 19, wherein the lower layer protocol includes at least one of L1, L2, or medium access control (MAC) layer protocol.

21. A method according to claim 20, wherein the control message is received using the L1 or L2 protocol, if no data is to be received and no resources have been allocated for receiving the data.

22. A method according to claim 21, further comprising:
determining whether synchronization is obtained with respect to a communication link,
wherein the control message is transmitted using the MAC layer protocol if the data is to be transmitted and synchronization is obtained.

23. A method according to claim 19, wherein the one control field includes at least one of a resource allocation field, a modulation field, and a Hybrid ARQ (HARQ) field.

24. A method according to claim 19, wherein the control message indicates whether to apply Hybrid ARQ (HARQ) within the one control field.

25. A non-transitory computer-readable storage medium carrying one or more sequences of one or more instructions which, when executed by one or more processors, cause an apparatus to at least perform the following steps:
receiving a control message having a format designated for resource allocation, wherein the control message includes a plurality of control fields, and a value of one of the control fields is reserved to specify information other than information for resource allocation, the value indicating information for starting of a non-contention based random access procedure,
wherein the control message is received over a control channel according to a lower layer protocol.

26. An apparatus comprising:
at least one processor; and
at least one memory including computer program code for one or more programs, the at least one memory and the computer program code configured to, with the at least one processor, cause the apparatus to perform at least the following,
receive a control message having a format designated for resource allocation, wherein the control message includes a plurality of control fields, and a value of one of the control fields is reserved to specify information other than information for resource allocation, the value indicating information for starting of a non-contention based random access procedure,
wherein the control message is received over a control channel according to a lower layer protocol.

27. An apparatus according to claim 26, wherein the one control field includes at least one of a resource allocation field, a modulation field, and a Hybrid ARQ (HARQ) field.

28. An apparatus according to claim 26, wherein the control message indicates whether to apply Hybrid ARQ (HARQ) within the one control field.

29. A method according to claim 26, wherein the lower layer protocol includes at least one of L1, L2, or medium access control (MAC) layer protocol.

30. An apparatus according to claim 29, wherein the control message is received using the L1 or L2 protocol, if no data is to be received and no resources have been allocated for receiving the data.

31. An apparatus according to claim 30, wherein the apparatus is further caused to determine whether synchronization is obtained with respect to a communication link, wherein the control message is received using the MAC layer protocol if the data is received and synchronization is obtained.

\* \* \* \* \*